(12) United States Patent
Dombrowski

(10) Patent No.: US 10,258,898 B2
(45) Date of Patent: Apr. 16, 2019

(54) ADHESIVE STRIP INCLUDING AN ARRAY OF APERTURES FOR ADDITIONAL RETENTION OF INTERLOCKING BRICKS

(71) Applicant: Mary-Claudette Dombrowski, Libertyville, IL (US)

(72) Inventor: Mary-Claudette Dombrowski, Libertyville, IL (US)

( * ) Notice: Subject to any disclaimer, the term of this patent is extended or adjusted under 35 U.S.C. 154(b) by 60 days.

(21) Appl. No.: 15/052,875

(22) Filed: Feb. 25, 2016

(65) Prior Publication Data
US 2017/0247576 A1    Aug. 31, 2017

(51) Int. Cl.
| | |
|---|---|
| B32B 3/24 | (2006.01) |
| A63H 33/14 | (2006.01) |
| C09J 5/00 | (2006.01) |
| A63H 33/08 | (2006.01) |
| B32B 37/12 | (2006.01) |
| C09J 7/20 | (2018.01) |
| B32B 3/26 | (2006.01) |

(52) U.S. Cl.
CPC .......... *A63H 33/14* (2013.01); *A63H 33/086* (2013.01); *B32B 37/12* (2013.01); *C09J 5/00* (2013.01); *C09J 7/20* (2018.01); *B32B 3/266* (2013.01); *B32B 2405/00* (2013.01); *C09J 2201/122* (2013.01); *C09J 2201/128* (2013.01); *C09J 2201/20* (2013.01); *C09J 2201/606* (2013.01); *C09J 2400/226* (2013.01); *Y10T 428/24322* (2015.01)

(58) Field of Classification Search
CPC ............ Y10T 428/24322; A63H 33/14; A63H 33/04; B32B 3/266

USPC ....................... 428/137; 446/87; 52/603, 604
See application file for complete search history.

(56) References Cited

U.S. PATENT DOCUMENTS

| | | | |
|---|---|---|---|
| 4,041,201 A | 8/1977 | Wurker | |
| 4,307,526 A | 12/1981 | Wippern | |
| 6,331,337 B1 | 12/2001 | Osborn et al. | |
| 6,673,188 B1 | 1/2004 | Nakagawa | |
| 7,718,250 B2 | 5/2010 | Sieber et al. | |
| 8,414,999 B2 * | 4/2013 | Tachibana | B25B 11/005 428/137 |
| 8,893,450 B2 * | 11/2014 | Zohar | E04C 1/397 52/503 |

(Continued)

OTHER PUBLICATIONS

Pressure-sensitive adhesive, Wikipedia, https://en.wikipedia.org/wiki/Pressure-sensitive_adhesive.

(Continued)

*Primary Examiner* — William P Watkins, III
(74) *Attorney, Agent, or Firm* — Matthew Loppnow; The Watson I.P. Group, PLC

(57) ABSTRACT

An adhesive strip includes an array of apertures that provides additional retention of interlocking bricks. The adhesive strip can include a carrier material. The carrier material can include a plurality of evenly spaced and evenly sized apertures in an array of at least two columns by two rows. The carrier material can include a first carrier material side. The carrier material can include a second carrier material side on an opposite side of the carrier material from the first carrier material side. The adhesive strip can include a pressure-sensitive adhesive coating arranged on the first carrier material side.

16 Claims, 8 Drawing Sheets

(56) References Cited

U.S. PATENT DOCUMENTS

2009/0311473 A1* 12/2009 Husemann ............. C09J 7/0242
428/137
2010/0311299 A1 12/2010 Rath

OTHER PUBLICATIONS

File:Lego dimensions.svg, Wikimedia, https://commons.wikimedia.org/wiki/File:Lego_dimensions.svg.

* cited by examiner

ADHESIVE STRIP INCLUDING AN ARRAY OF APERTURES FOR ADDITIONAL RETENTION OF INTERLOCKING BRICKS

BACKGROUND

1. Field

The present disclosure is directed to an adhesive strip including an array of apertures. More particularly, the present disclosure is directed to an adhesive strip including an array of apertures that provides additional retention of interlocking bricks.

2. Introduction

Presently, children and hobbyists build structures using interlocking bricks. For example, both children and adults construct objects, such as vehicles, buildings, working robots, among other things, with interlocking plastic bricks, such as Lego® bricks. While the interlocking bricks provide for easy disassembly, under some circumstances there is a desire to preserve the constructed object. Unfortunately, the interlocking features of the brick are insufficient to preserve a frequently, roughly, and/or carelessly handled structure and are even insufficient to preserve a normally handled fragile structure and the creation easily falls apart, creating frustration.

Liquid dispensed glue can be used to supplement the interlocking features and adhere the bricks together. However, the glue is messy, unintentionally adheres to surrounding objects including fingers, and makes an interlocking brick-based structure difficult to disassemble, sometimes requiring the use of chemicals.

Thus, there is a need for an adhesive strip including an array of apertures that can provide a more secure bond between interlocking bricks while still providing for disassembly, if desired.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide an adhesive strip including an array of apertures that provides additional retention of interlocking bricks. According to a possible embodiment, the adhesive strip can include a carrier material. The carrier material can include a plurality of evenly spaced and evenly sized apertures in an array of at least two columns by two rows. The carrier material can include a first carrier material side. The carrier material can include a second carrier material side on an opposite side of the carrier material from the first carrier material side. The adhesive strip can include a pressure-sensitive adhesive coating arranged on the first carrier material side.

Figure 1:
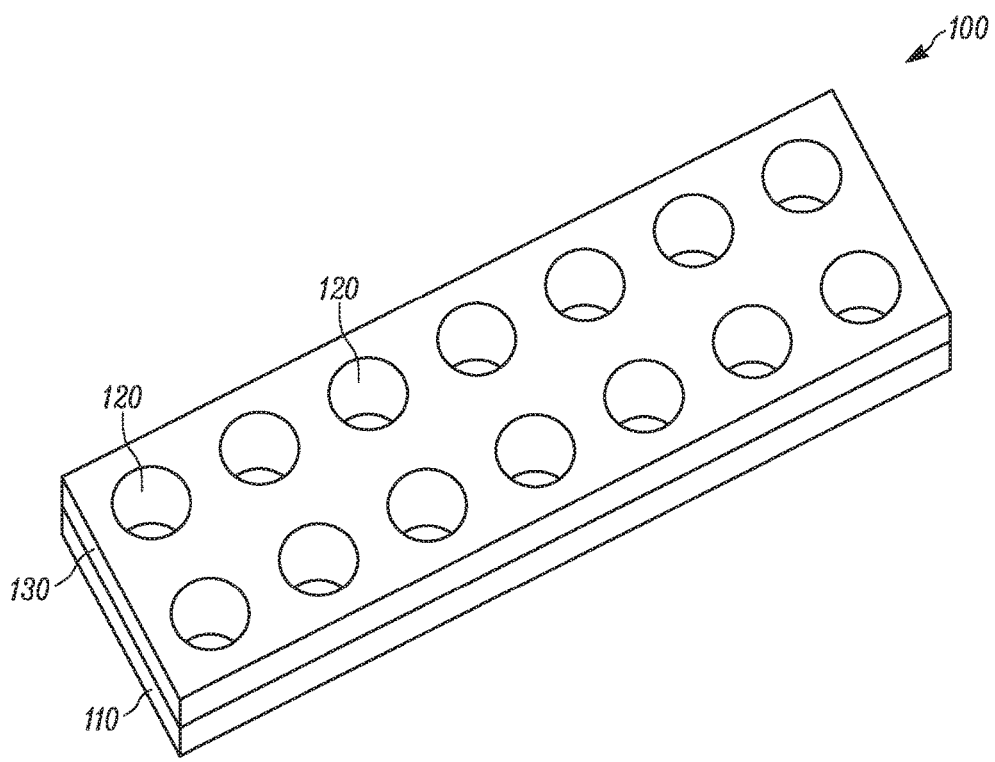
FIG. 1 is an example isometric view of an adhesive strip according to a possible embodiment.
Figure 2:
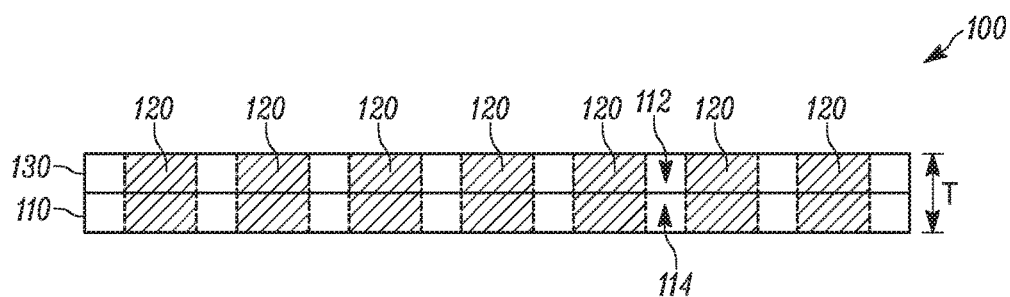
FIG. 2 is an example side view of the adhesive strip according to a possible embodiment.
Figure 3:
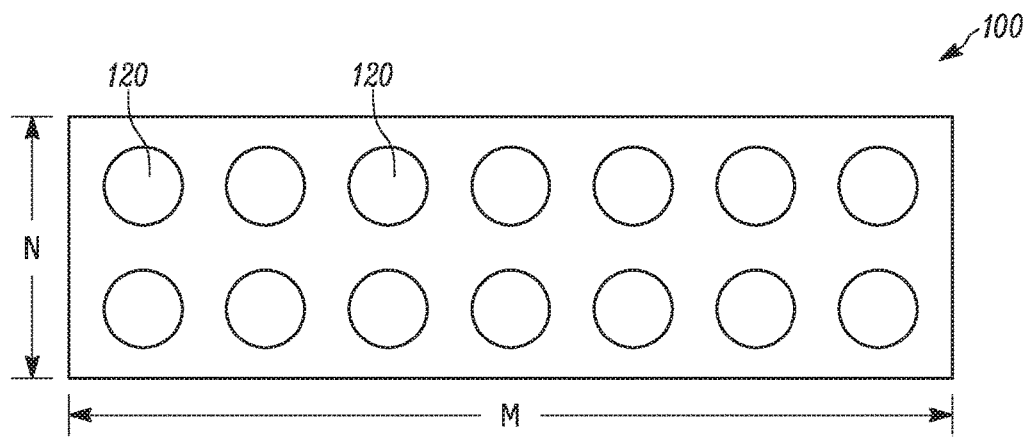
FIG. 3 is an example top view of the adhesive strip according to a possible embodiment.

FIG. 1 is an example isometric view of an adhesive strip 100 according to a possible embodiment. FIG. 2 is an example side view of the adhesive strip 100 according to a possible embodiment. FIG. 3 is an example top view of the adhesive strip 100 according to a possible embodiment. It should be noted that the adhesive strip 100 is not necessarily drawn to scale for the purposes of illustrating disclosed embodiments. For example, the adhesive strip 100 is shown proportionally thicker T than usual to illustrate different layers of the adhesive strip 100.

The adhesive strip 100 can include a carrier material 110. The carrier material 110 can have a plurality of evenly spaced and evenly sized apertures 120 in an array of at least two columns M by two rows N. The apertures 120 can be circular, triangular, square, pentagonal, hexagonal, or any other shape. Even so, pentagonal, hexagonal, and other higher numbers of sides of apertures can still be considered circular for the purposes of this disclosure. The apertures 120 can be evenly spaced and evenly sized by having spacing and sizes within a tolerance of 10%, 5%, 2%, 1%, or any other useful tolerance such that the apertures are evenly spaced and evenly sized, where a tolerance can allow for a variation between sizes in the amount of the percentage.

The carrier material 110 can also have a first carrier material side 112 and a second carrier material side 114 on an opposite side of the carrier material 110 from the first carrier material side 112. The adhesive strip 100 can also include a pressure-sensitive adhesive coating 130 arranged on the first carrier material side 112. The pressure-sensitive adhesive coating 130 can include the plurality of evenly spaced and evenly sized apertures 120, such as apertures aligned with the plurality of evenly spaced and evenly sized apertures of the carrier material 110.

The adhesive strip 100 can be double faced, can use a low, medium, or high tack pressure-sensitive adhesive, can be low, medium, or high tack tape, can be removable tape, can be permanent tape, and/or can be permanent on one side and removable on the other. For example, the pressure-sensitive adhesive coating 130 can be low tack or medium tack to provide for disassembly of interlocking bricks, such as interlocking toy plastic bricks. Alternately, the pressure-sensitive adhesive coating 130 can be high tack to provide for permanent attachment of the interlocking bricks.

A pressure-sensitive adhesive, such as the pressure-sensitive adhesive coating 130 and otherwise known as a self-adhesive or a self-stick adhesive, can be an adhesive that forms a bond when pressure is applied to many the adhesive with an adherend, such as an interlocking toy brick. A pressure-sensitive adhesive can usually be based on an elastomer compounded with a suitable tackifier. For example, pressure-sensitive adhesives can be manufactured with either a liquid carrier, in 100% solid form, or otherwise manufactured. Articles such as tapes and labels can be made from liquid pressure-sensitive adhesives by coating the adhesive on a support, such as the carrier material 110, and evaporating the organic solvent or water carrier, such as in a hot air dryer. The dry adhesive may be further heated to initiate a cross-linking reaction and increase molecular weight. 100% solid pressure-sensitive adhesives may be radiation cured pressure-sensitive adhesives that can be low viscosity polymers that are coated and then reacted with radiation to increase molecular weight and form the adhesive or they may be high-viscosity materials that are heated to reduce viscosity enough to allow coating, and then cooled to their final form. The pressure-sensitive adhesive coating 130 can be a permanent or removable adhesive. For example, a removable adhesive can be designed to form a temporary bond, and can be removed after months or years without leaving residue on the adherend. The materials can be non-toxic to prevent harm from accidental ingestion, such as by a child or a pet.

The adhesive strip 100 can include a release liner coupled to the pressure-sensitive adhesive coating 130. The release liner can be a paper, plastic, or other medium-based film sheet that can be used to prevent a sticky surface from prematurely adhering. It can be coated on a side of the pressure-sensitive adhesive coating 130 with a release agent, which can provide a release effect against the pressure-sensitive adhesive coating 130. According to a possible embodiment, the carrier material 110 can be the release liner. According to another possible embodiment, the release liner can be separate from the carrier material 110. For example, a release liner can be on an opposite side of the pressure-sensitive adhesive coating 130 from the carrier material 110. As a further example, the carrier material 110 can be embedded within the pressure-sensitive adhesive coating 130, such as by having the pressure-sensitive 130 coating on both sides of the carrier material 110 and the release liner can be on an opposite side of the pressure-sensitive adhesive coating 130 from the carrier material 110.

The adhesive strip or sheet can have a thickness T between 0.02 mm and 0.30 mm, but may increase to as much as 2 mm. The ranges can also be within 2 mm, 0.5 mm, 0.13 mm, 0.05 mm or any other variation to accommodate interlocking bricks.

Figure 4:
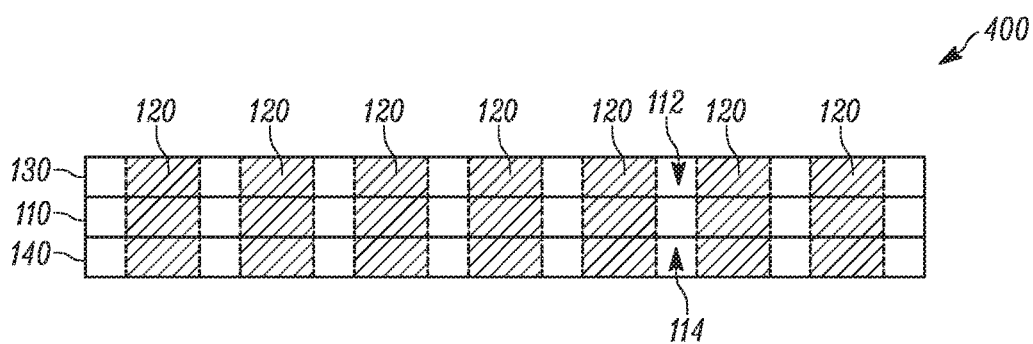
FIG. 4 is an example side view of an adhesive strip according to a possible embodiment.

FIG. 4 is an example side view of an adhesive strip 400, such as the adhesive strip 100, according to a possible embodiment. The adhesive strip 400 can include the carrier material 110, the apertures 120, and the pressure-sensitive adhesive coating 130 of the adhesive strip 100. The pressure-sensitive adhesive coating 130 can be a first pressure-sensitive adhesive coating and the adhesive strip 400 can include a second pressure-sensitive adhesive coating 140 arranged on the second carrier material side 114. For example, the carrier material 110 can include a pressure-sensitive adhesive coating on one or both sides of the carrier material 110. The carrier material 110 can have pressure-sensitive adhesive on both sides by being embedded in the pressure-sensitive adhesive or by having pressure-sensitive adhesive placed on both sides of the carrier material 110. The pressure-sensitive adhesive can be high tack on one side of the carrier material 110 and low tack on another side of the carrier material 110 or can be the same tack on both sides of the carrier material 110. The combination of the carrier material 110 and the pressure-sensitive adhesive coatings 130 and 140 can be a double-sided film-based adhesive.

Figure 5:
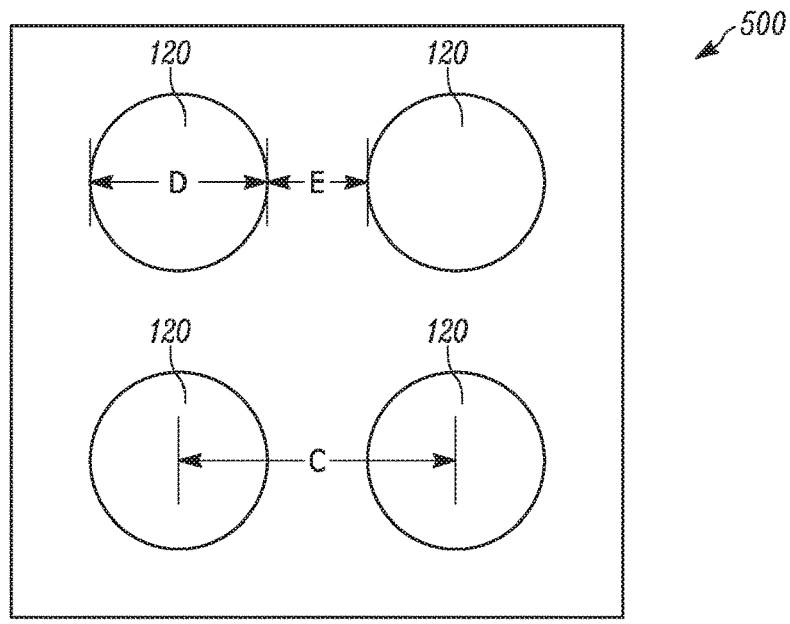
FIG. 5 is an example top view of an adhesive strip according to a possible embodiment.

FIG. 5 is an example top view of an adhesive strip 500, such as the adhesive strip 100, according to a possible embodiment. The adhesive strip 500 can include the apertures 120, which can be circular. Centers of the circular apertures 120 can be spaced apart from each other at a distance C within a range of 7.5 and 8.5 mm For example, the centers of the circular apertures 120 can be spaced substantially 8 mm apart. The circular apertures 120 can also have a diameter D within a range of 4.7 and 5.1 mm within a variation of 1 mm.

Furthermore, edges of the circular apertures 120 can be spaced at a distance E anywhere between and including 2.7 and 3.4 mm apart from each other. For example, the edges of the circular apertures 120 can be spaced at a distance E of 2.7 mm, 3 mm, 3.1 mm, 3.2 mm, 3.3 mm apart including any distances in between 2.7 and 3.4 mm. Alternately, the adhesive strip 500 can include apertures 120 of other shapes, dimensions, and spacing to provide for use with different types of interlocking bricks.

Figure 6:
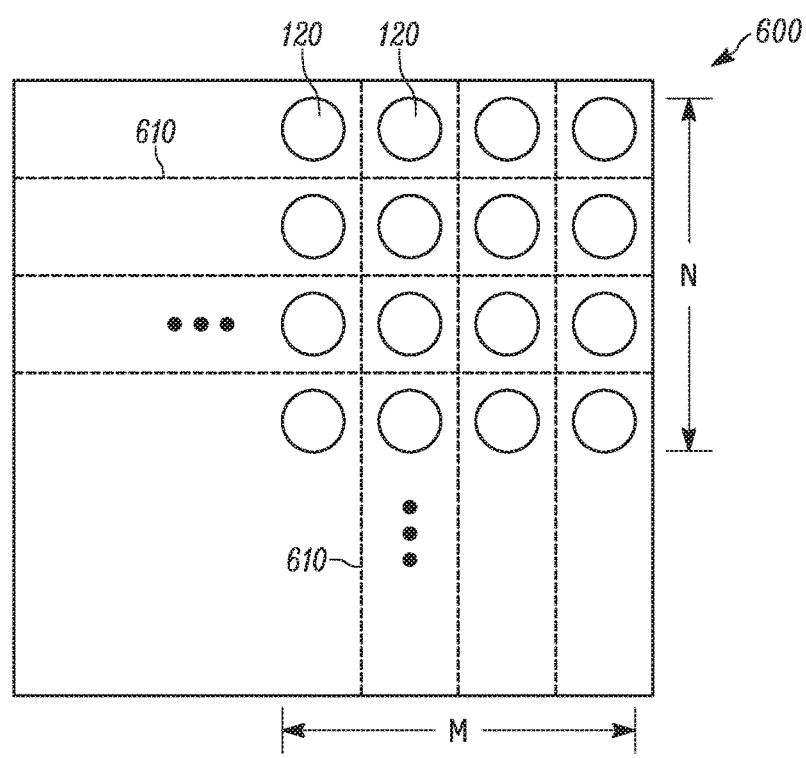
FIG. 6 is an example top view of an adhesive strip according to a possible embodiment.

FIG. 6 is an example top view of an adhesive strip 600, such as the adhesive strip 100, according to a possible embodiment. The adhesive strip 600 can be a sheet including the apertures 120 arranged in at least four columns M by at least four rows N. The adhesive strip 600 can include perforations 610 in the carrier material between each aperture, where the perforations 610 can allow a user to tear the adhesive strip 600 using the user's hands. For example, carrier material can have perforations 610 and layered pressure-sensitive material can be kiss cut with a cut partially through the pressure-sensitive material aligning with the carrier material perforations 610. Also, the pressure-sensitive material may not be cut at all or can include perforations 610 aligning with the carrier material perforations 610. Furthermore, the carrier material and the pressure-sensitive material can be cut with the perforations 610 at the same time. Instead of or along with the perforations 610, the carrier material and/or the pressure sensitive material of the adhesive strip 600 can include any other features that allow a user to tear the adhesive strip 600 using the user's hands. The user can also cut the adhesive strip 600 using a knife, cut the adhesive strip 600 using scissors, tear the adhesive strip 600 using an edge of a dispenser, or otherwise separate sections of the adhesive strip 600 from each other according to sizes desired for interlocking bricks. When provided as a sheet, the adhesive strip 600 can include release liners on both sides to prevent the adhesive strip 600 from accidentally attaching to other objects.

Figure 7:
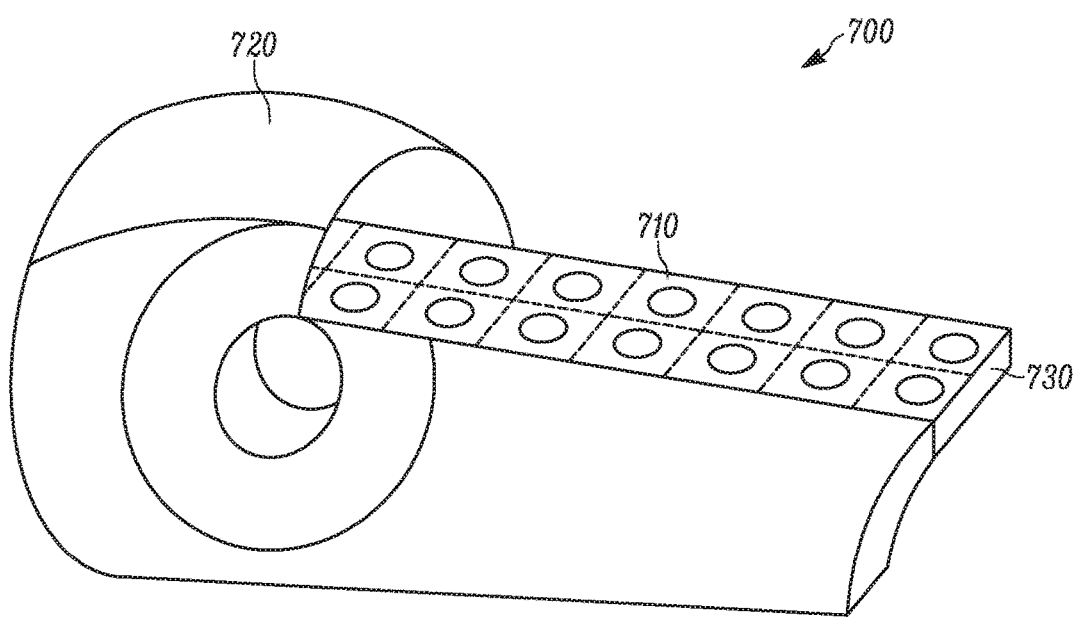
FIG. 7 is an example illustration of an adhesive strip and a dispenser according to a possible embodiment.

FIG. 7 is an example illustration 700 of an adhesive strip 710, such as the adhesive strip 100 and a dispenser 720, according to a possible embodiment. Regardless of whether the dispenser 720 is used to dispense the adhesive trip 710, the adhesive strip 710 can rolled upon itself for dispensing. The dispenser 720 can include an edge 730 that allows a user to tear the adhesive strip 710 for a desired size.

Figure 8:
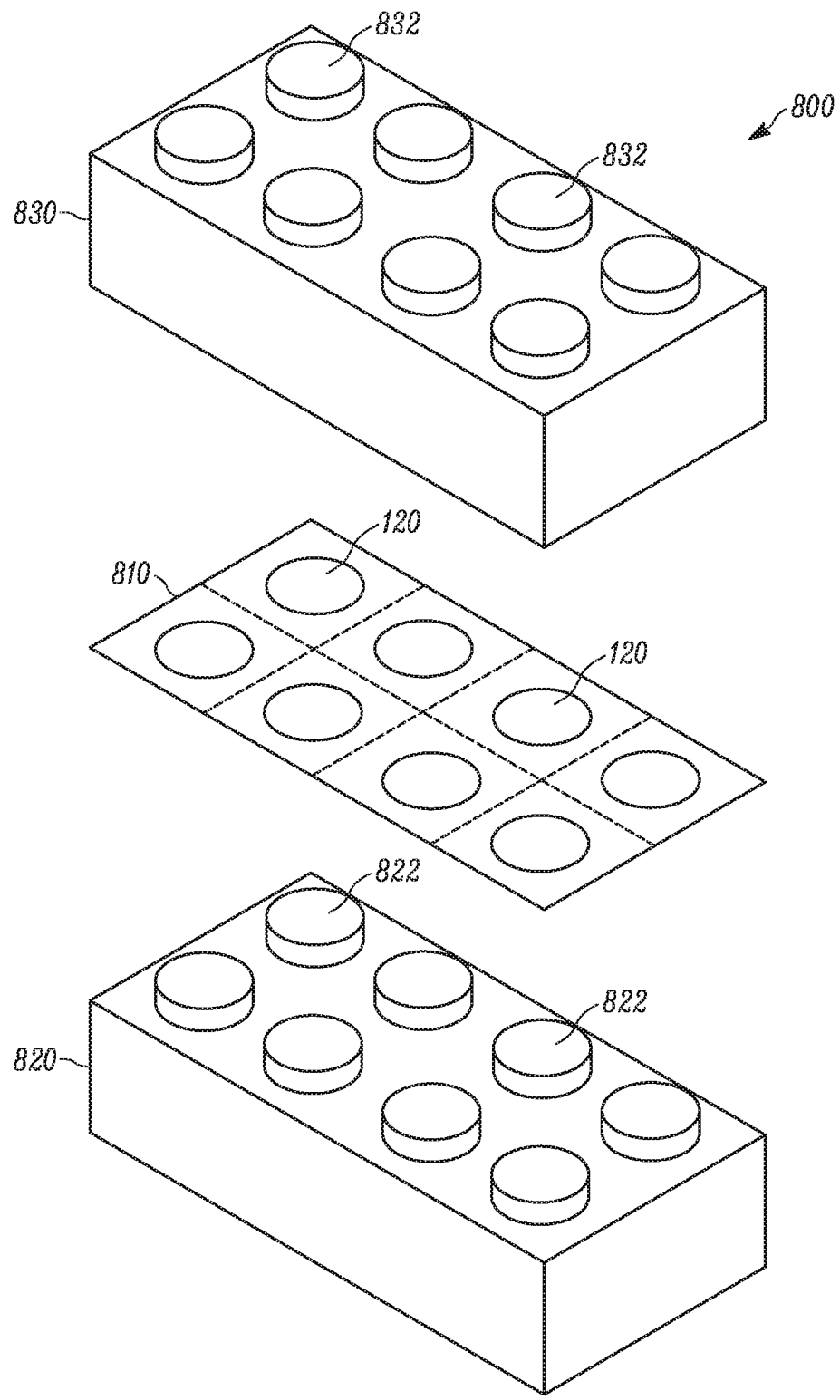
FIG. 8 is an example illustration of an adhesive strip, a first interlocking brick, and a second interlocking brick according to a possible embodiment.
Figure 9:
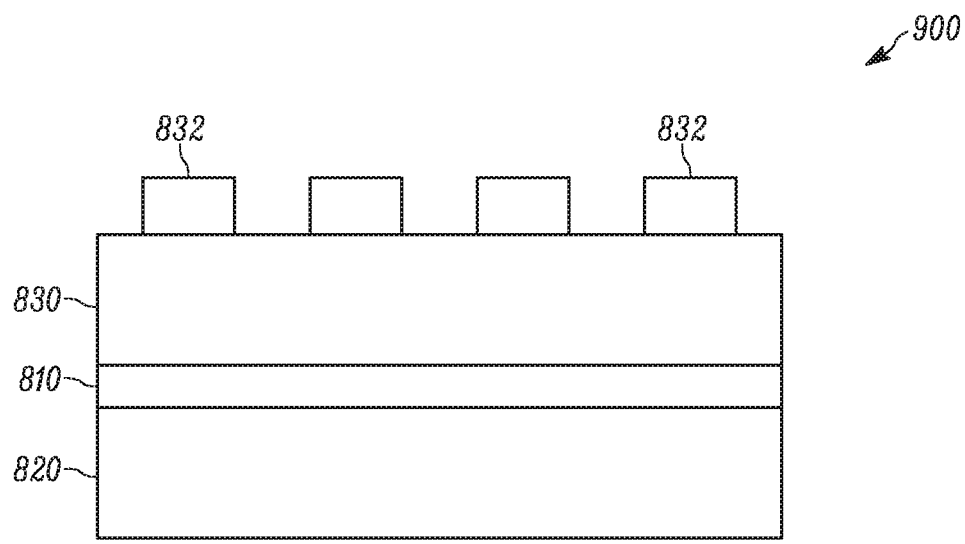
FIG. 9 is an example illustration of the adhesive strip, the first interlocking brick, and the second interlocking brick according to a possible embodiment.

FIG. 8 is an example illustration 800 of an adhesive strip 810, such as the adhesive strip 100, a first interlocking brick 820, and a second interlocking brick 830 according to a possible embodiment. FIG. 9 is an example illustration of the adhesive strip 810, the first interlocking brick 820, and the second interlocking brick 830 according to a possible embodiment. The adhesive trip 810 can include the apertures 120. The interlocking bricks 820 and 830 can include protruding posts 822 and 832, respectively. The apertures 120 can be latitudinally arranged and longitudinally arranged to accommodate the protruding posts 822 and 832 of the interlocking plastic bricks 820 and 830. The protruding posts 822 and 832 can be cylinders, cubes, rectangular cubiods, or any other protruding posts that can provide for connection of interlocking plastic bricks. The protruding posts 822 and 832 can also be known as studs, protrusion posts, and/or projections. The protruding posts 822 of the interlocking brick 820 can fit inside the apertures 120. The interlocking bricks 820 and 830 can then be coupled via the adhesive strip 810 as shown in the illustration 900 so the adhesive strip 810 can form a more secure bond between the interlocking bricks 820 and 830 than when adhesive strip is not used.

Figure 10:
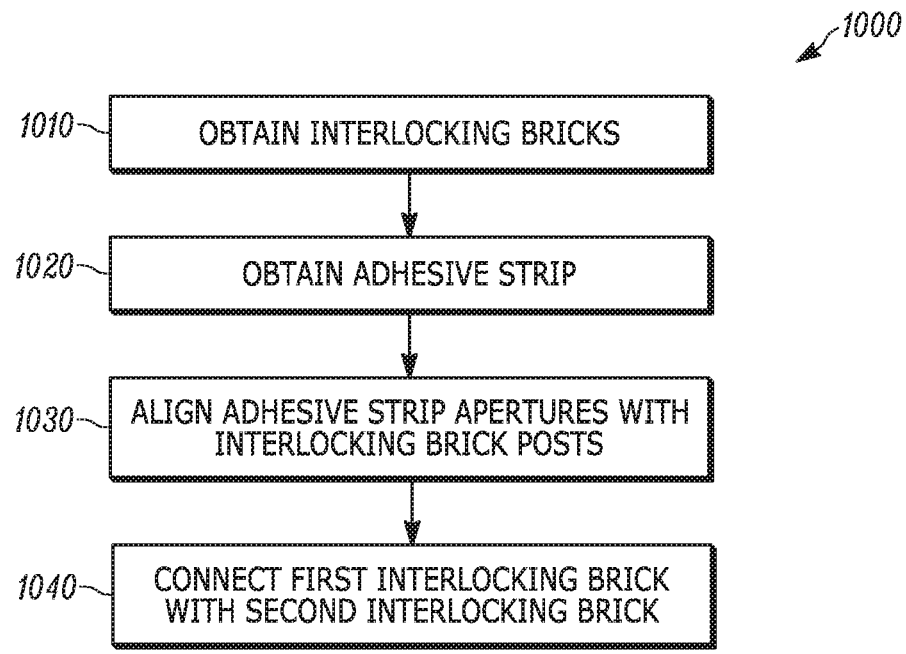
FIG. 10 is an example flowchart illustrating use of the disclosed adhesive strips according to a possible embodiment.

FIG. 10 is an example flowchart 1000 illustrating use of the disclosed adhesive strips according to a possible embodiment. At 1010, a plurality of interlocking plastic bricks can be obtained. The plurality of interlocking plastic bricks can include protrusion posts on protrusion sides of the interlocking plastic bricks and corresponding slots on slot sides of the interlocking plastic bricks for interlocking the plastic bricks.

At 1020, an adhesive strip can be obtained. The adhesive strip can include a carrier material. The carrier material can have an array of evenly spaced and evenly sized apertures, a first carrier material side, and a second carrier material side opposite from the first carrier material side. The apertures can be circular apertures arranged in at least two columns of circular apertures by at least two rows of circular apertures. The circular apertures can have a diameter within a range of 4.7 and 5.1 mm The adhesive strip can also include a first pressure-sensitive adhesive coating arranged on the first carrier material side. According to a possible implementation, the pressure-sensitive adhesive coating can be a first pressure-sensitive adhesive coating and the adhesive strip can include a second pressure-sensitive adhesive coating arranged on the second carrier material side. The adhesive strip can further include a release liner coupled to the pressure-sensitive adhesive coating.

At 1030, the adhesive strip can be aligned with an interlocking plastic brick so that the interlocking plastic brick protrusion posts on the protrusion side of a first interlocking plastic brick insert into the array of evenly spaced and evenly sized apertures. At 1030, the protrusion side with the adhesive material of the first interlocking plastic brick can be connected to a slot side of a second interlocking plastic brick to create a more secure connection between the interlocking plastic bricks.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 11:
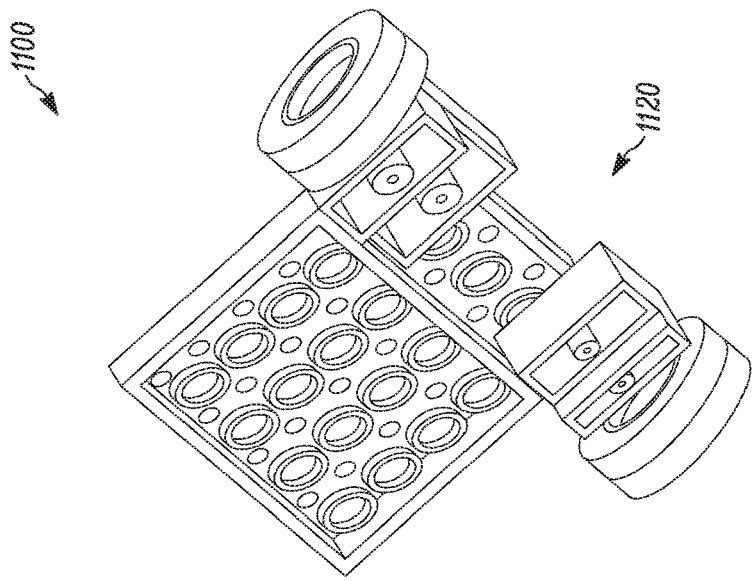
FIG. 11 is an example illustration of structures of interlocking plastic bricks.
Figure 11:
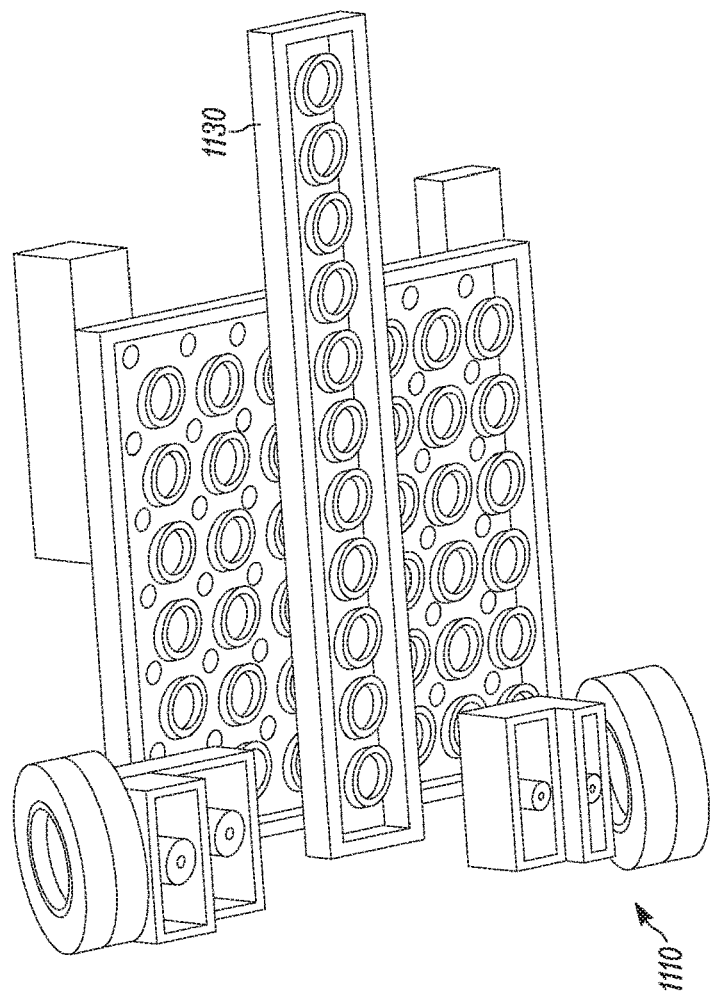
Figure 12:
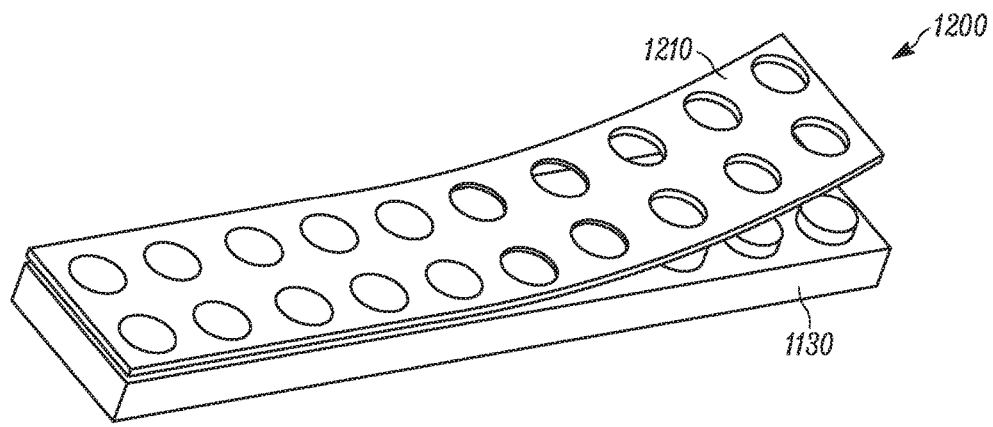
FIG. 12 is an example illustration of alignment of an adhesive strip onto an interlocking plastic brick according to a possible embodiment.
Figure 13:
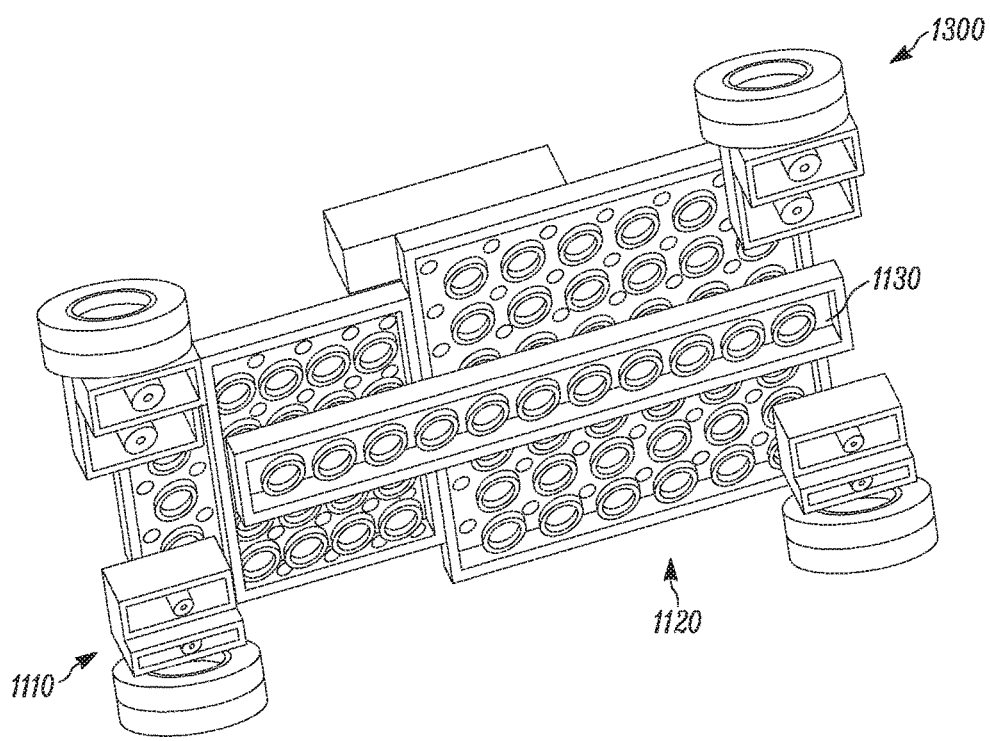
FIG. 13 is an example illustration of structures of interlocking plastic bricks held together by an adhesive strip according to a possible embodiment.

FIG. 11 is an example illustration 1100 of structures 1110 and 1120 of interlocking plastic bricks including a connecting interlocking plastic brick 1130 according to a possible embodiment. As shown, the structures 1110 and 1120 of interlocking plastic bricks easily come apart without using an adhesive strip of the disclosed embodiments on the connecting interlocking plastic brick 1130. FIG. 12 is an example illustration 1200 of alignment of an adhesive strip 1210 onto the connecting interlocking plastic brick 1130 according to a possible embodiment. FIG. 13 is an example illustration 1300 of the structures 1110 and 1120 of interlocking plastic bricks that are more securely held together because of the adhesive strip between the structures 1110 and 1120 according to a possible embodiment.

Embodiments can provide for an adhesive strip including an array of apertures. Adding the adhesive strip, such as a film-based adhesive, between interlocking bricks in a pre-cut pattern compatible with the interlocking features of the bricks can be used to supplement the interlocking features and adhere the bricks together. This can create a more robust bond between bricks for a more stable object. Unlike a liquid dispensed glue, the film-based adhesive can allow for safer handling by children and can still provide for the ability to disassemble a resulting structure, if desired. The patterned film based adhesive also can be cleaner for handling, can reduce the risk of unintentionally adhering to surrounding objects, and can still offer some ability to disassemble adhered interlocking bricks.

According to some embodiments, the adhesive can be aligned over an interlocking brick. The adhesive can be torn to fit and match the brick size and placed on the interlocking brick. Then the intended connecting brick can be attached above it, essentially sandwiching the adhesive between the two bricks. According to other related embodiments, a dispenser can be used where the user can align the brick to the adhesive using a post-like features in the dispenser. The adhesive can align over the dispenser post and the interlocking brick can fit over the post onto the adhesive. The adhesive can be torn to match the brick size and the brick can then be placed in its intended location.

According to other related embodiments, the adhesive can be in a sheet form with release liners on both sides. The user can tear off the right size of the adhesive to match the brick size, remove one of the release liners, attach the adhesive to the brick, remove the other release liner, then place the brick in its intended location. The adhesive strip can hold the interlocking bricks together. The apertures, such as pre-cut holes, in the film adhesive can allow the adhesive strip to lie flat between the bricks and provide for the operation of the interlocking features of the bricks. The apertures can also provide an alignment feature for the adhesive to be placed properly and neatly over a brick. A perforation pattern can allow the size of the adhesive strip to be adaptable to various brick sizes. For example, a double sided film based adhesive strip can be cut in a pre-described pattern with holes and perforations and can be available in a roll or as a sheet.

Embodiments can further provide for a double-sided film-based adhesive strip with an affinity to adhere to interlocking bricks. The adhesive can be selected that will adhere to the material used to fabricate interlocking bricks, such as ABS Plastic. The film-based adhesive strip can have a cut pattern that is compatible with the interlocking bricks and it can be double-sided to adhere to both the brick above and below the adhesive strip. Embodiments can also provide for perforations in double-sided film-based adhesive strips. The perforations allow the adhesive to be torn to adjust and be adaptable to various brick sizes. For example, for a single row the adhesive strip can be torn to be a width that matches that of a single row of brick posts. As another example, if the brick is four posts long, the adhesive can be torn to match a four post brick's length. Embodiments can also provide for apertures, such as holes, in a double-sided film based adhesive to be compatible with brick interlocking features. The holes can provide the ability for the brick's interlocking features to engage and also provide alignment features for the adhesive to be placed on an interlocking brick.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" or "at least one selected from the group of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

I claim:

1. An adhesive strip comprising:
    a carrier material including
        a plurality of evenly spaced and evenly sized apertures in an array of at least two columns by two rows,
        a first carrier material side, and
        a second carrier material side on an opposite side of the carrier material from the first carrier material side; and
    a pressure-sensitive adhesive coating arranged on the first carrier material side,
    wherein the apertures are latitudinally arranged and longitudinally arranged to accommodate protruding posts of interlocking plastic bricks,
    wherein the pressure-sensitive adhesive coating includes plurality of evenly spaced and evenly sized apertures aligned with the plurality of evenly spaced and evenly sized apertures of the carrier material to accommodate protruding posts of interlocking plastic toy bricks,
    wherein the apertures comprise circular apertures arranged in at least two columns of circular apertures by at least two rows of circular apertures to accommodate protruding posts of interlocking plastic toy bricks,
    wherein centers of the circular apertures are spaced apart from each other at a distance within a range of 7.5 and 8.5 mm to accommodate protruding posts of interlocking plastic toy bricks,
    wherein the circular apertures have a diameter within a range of 4.7 and 5.1 mm to accommodate protruding posts of interlocking plastic toy bricks, and
    wherein the evenly spaced and evenly sized apertures are created in the carrier material prior to application of the adhesive strip to accommodate protruding posts of interlocking plastic bricks.

2. The adhesive strip according to claim 1,
    wherein the pressure-sensitive adhesive coating comprises a first pressure-sensitive adhesive coating, and
    wherein the adhesive strip further comprises a second pressure-sensitive adhesive coating arranged on the second carrier material side.

3. The adhesive strip according to claim 1, further comprising a release liner coupled to the pressure-sensitive adhesive coating.

4. The adhesive strip according to claim 3, wherein the carrier material comprises the release liner.

5. The adhesive strip according to claim 3, wherein the release liner is on an opposite side of the pressure-sensitive adhesive coating from the carrier material.

6. The adhesive strip according to claim 1, wherein the carrier material further comprises perforations in between each aperture, where the perforations allow a user to tear the adhesive strip using the user's hands.

7. The adhesive strip according to claim 1, wherein the adhesive strip is rolled upon itself for dispensing.

8. The adhesive strip according to claim 1, wherein the adhesive strip comprises a sheet including apertures arranged in at least four columns by at least four rows.

9. A method comprising:
    obtaining a plurality of interlocking plastic toy bricks including protrusion posts on protrusion sides of the interlocking plastic toy bricks and corresponding slots on slot sides of the interlocking plastic toy bricks for interlocking the interlocking plastic toy bricks;
    obtaining an adhesive strip including a carrier material having an array of evenly spaced and evenly sized apertures, a first carrier material side, and a second carrier material side opposite from the first carrier material side, where the adhesive strip also includes a first pressure-sensitive adhesive coating arranged on the first carrier material side,
        wherein the pressure-sensitive adhesive coating includes plurality of evenly spaced and evenly sized apertures aligned with the plurality of evenly spaced and evenly sized apertures of the carrier material to accommodate protruding posts of the interlocking plastic toy bricks, and
        wherein the pressure-sensitive adhesive coating circular apertures and the carrier material circular apertures are latitudinally arranged and longitudinally arranged to accommodate protruding posts of the interlocking plastic toy bricks;
    aligning the adhesive strip so that the interlocking plastic toy brick protrusion posts on the protrusion side of a first interlocking plastic toy brick insert into the array of evenly spaced and evenly sized apertures; and
    connecting the protrusion side of the first interlocking plastic toy brick including the adhesive strip to a slot side of a second interlocking plastic toy brick,
        wherein the apertures comprise circular apertures arranged in at least two columns of circular apertures by at least two rows of circular apertures to accommodate protruding posts of interlocking plastic toy bricks,
wherein the circular apertures have a diameter within a range of 4.7 and 5.1 mm to accommodate protruding posts of interlocking plastic toy bricks,
wherein centers of the circular apertures are spaced apart from each other at a distance within a range of 7.5 and 8.5 mm to accommodate protruding posts of interlocking plastic toy bricks,
wherein the apertures are latitudinally arranged and longitudinally arranged to accommodate protruding posts of interlocking plastic toy bricks,
wherein the pressure-sensitive adhesive coating includes plurality of evenly spaced and evenly sized apertures aligned with the plurality of evenly spaced and evenly sized apertures of the carrier material to accommodate protruding posts of interlocking plastic toy bricks, and
wherein the evenly spaced and evenly sized apertures are created in the carrier material prior to application of the adhesive strip to accommodate protruding posts of interlocking plastic bricks.

10. The method according to claim 9, wherein the adhesive strip includes a release liner coupled to the pressure-sensitive adhesive coating.

11. The method according to claim 9,
wherein the pressure-sensitive adhesive coating comprises a first pressure-sensitive adhesive coating, and
wherein the adhesive strip includes a second pressure-sensitive adhesive coating arranged on the second carrier material side.

12. An apparatus comprising:
an adhesive strip comprising:
  a carrier material including
    a plurality of substantially evenly spaced and evenly sized carrier material circular apertures in an array of at least two columns by two rows of circular apertures to accommodate protruding posts of interlocking plastic bricks, where the carrier material circular apertures have a diameter within a range of 4.7 and 5.1 mm to accommodate protruding posts of interlocking plastic bricks,
    a first carrier material side, and
    a second carrier material side on an opposite side of the carrier material from the first carrier material side;
  a pressure-sensitive adhesive coating arranged on the first carrier material side, where the pressure-sensitive adhesive provides a bond when pressure is applied to marry the pressure-sensitive adhesive to plastic, and where the pressure-sensitive adhesive coating including pressure-sensitive adhesive coating circular apertures aligned with the carrier material circular apertures,
    wherein the pressure-sensitive adhesive coating includes plurality of evenly spaced and evenly sized apertures aligned with the plurality of evenly spaced and evenly sized apertures of the carrier material to accommodate protruding posts of interlocking plastic toy bricks,
    wherein the pressure-sensitive adhesive coating circular apertures and the carrier material circular apertures are latitudinally arranged and longitudinally arranged to accommodate protruding posts of interlocking plastic toy bricks, and
    wherein centers of the circular apertures are spaced apart from each other at a distance within a range of 7.5 and 8.5 mm to accommodate protruding posts of interlocking plastic toy bricks; and
  an interlocking plastic toy brick coupled to the pressure-sensitive adhesive coating, where the interlocking plastic toy brick includes protrusion posts on a protrusion side of the interlocking plastic toy brick, the protruding posts inside of the plurality of evenly spaced and evenly sized apertures.

13. The apparatus according to claim 12, further comprising a release liner coupled to the pressure-sensitive adhesive coating, the release liner including a release agent coupled to the pressure-sensitive adhesive coating and a release liner sheet on an opposite side of the release agent from the pressure-sensitive adhesive coating.

14. The adhesive strip according to claim 1,
wherein the pressure-sensitive adhesive coating is coupled to an interlocking plastic toy brick, where the interlocking plastic toy brick includes protrusion posts on a protrusion side of the interlocking plastic toy brick, the protruding posts inside of the plurality of evenly spaced and evenly sized apertures.

15. The method according to claim 9, wherein the carrier material further comprises perforations in between each aperture, where the perforations allow a user to tear the adhesive strip using the user's hands.

16. The apparatus according to claim 12,
wherein the interlocking plastic toy brick comprises a first interlocking plastic toy brick having a protrusion side of the first interlocking plastic toy brick,
wherein the apparatus further comprises a second interlocking plastic toy brick including at least one slot on a slot side of the second interlocking plastic toy brick,
wherein the protrusion posts of the first interlocking plastic toy brick are inserted into the at least one slot of the second interlocking plastic toy brick, and
wherein the adhesive strip is connected to the protrusion side of the first interlocking plastic toy brick and connected to slot side of the second interlocking plastic toy brick.

\* \* \* \* \*